April 18, 1933. A. C. TRAVIS, JR 1,904,393
STEAM TRAP
Filed June 12, 1931
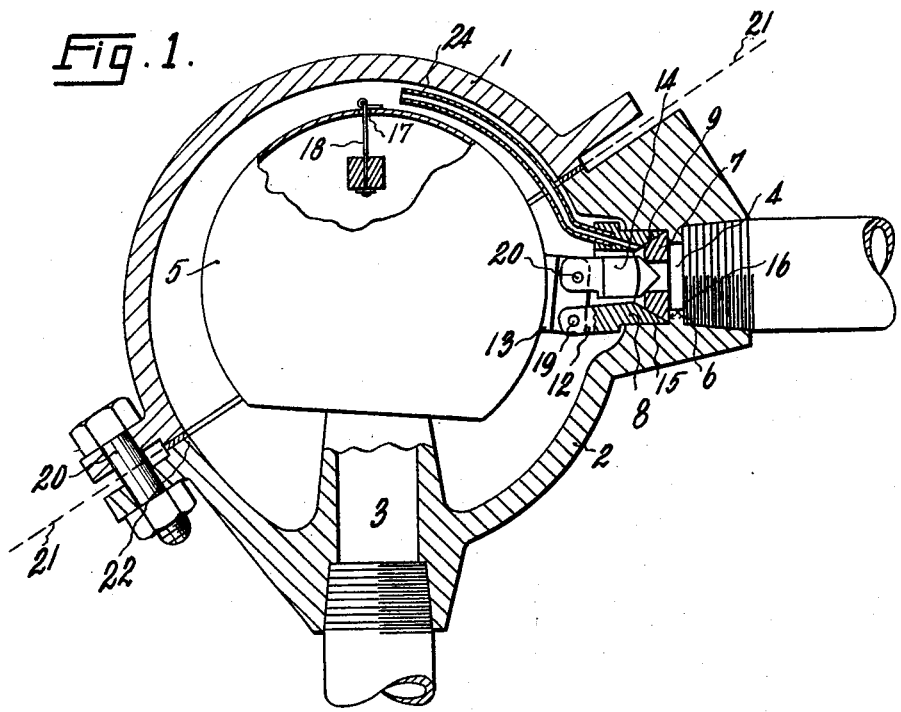
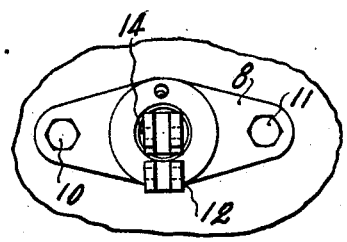
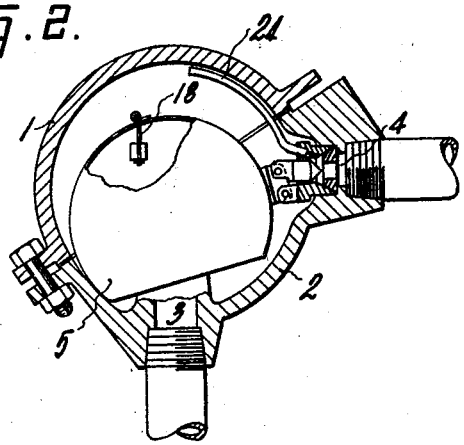
INVENTOR.
ALBERT CHESTER TRAVIS, JR.
BY Chapin & Neal
ATTORNEYS.

Patented Apr. 18, 1933

1,904,393

UNITED STATES PATENT OFFICE

ALBERT CHESTER TRAVIS, JR., OF JACKSON HEIGHTS, NEW YORK, ASSIGNOR TO A. W. HOLBROOK & SONS, INC., OF PALMER, MASSACHUSETTS, A CORPORATION OF MASSACHUSETTS

STEAM TRAP

Application filed June 12, 1931. Serial No. 543,827.

This invention relates to an improvement in steam traps and particularly of that kind using what is called the inverted bucket principle. In these traps the discharge is commonly at the top and the inlet at the bottom in line with the open end of the inverted bucket.

Whenever it is desirable to take this kind of a trap apart for inspection, repair, or replacement of parts, the prior art constructions require a lot of trouble. One object of my invention is to avoid such trouble and provide an extremely easy means of assembling and disassembling the trap and with the further advantage of low manufacturing cost.

It is customary in the inverted bucket type of trap to provide a vent hole in the top of the bucket for steam, otherwise trapped in the bucket, to leak gradually out and be condensed in the water surrounding the bucket. The efficiency of the trap depends partly on this action but frequently the vent hole gets clogged up and needs cleaning. One feature of my invention is to provide a particularly simple and automatic means that will keep the vent hole open during the operation of the trap and without attention.

According to another feature of my invention I have arranged the bucket of the steam trap in combination with a packless joint, valve, and valve seat for a novel and useful cooperation, as I will explain.

There are certain specific and detailed improvements in my new valve that will be best understood from the drawing and following description and claims.

Fig. 1 is a sectional view through the casing of the improved trap with the interior parts shown assembled and in, with the valved outlet closed;

Fig. 2 is a view like Fig. 1 on a reduced scale showing the mechanism in position with the valved outlet open; and Fig. 3 is a detail view looking at the interior of the casing around the outlet opening showing the gland, the valve stem with the bucket and vent pipe removed.

In its preferred form as shown in the drawing the trap comprises a spherical casing of two parts 1 and 2. The lower one has an inlet 3 at the bottom and an outlet 4 at the side for the pipe connections shown. The top one is without pipe connections. Within the casing is an inverted bucket 5 whose walls have a spherical shape for close spacing with the interior of the casing walls.

At the outlet opening I provide an internal flange 6. Against this rests an annular valve seat member 7 of frustrum form. A packless gland member 8, having a circular bore and an internal surface 9 to fit the outside surface of the valve seat member, is clamped by bolts 10 and 11 to the inside surface of the casing. An integral arm 12 extends inwardly from the gland member to serve as a support. The inverted bucket is pivoted at its side to this support 12 through a lug 13 that is clamped as a protuberance to the side wall of the bucket. To this same lug 12 just above the pivoted bucket support I pivot the end of valve stem 14.

The valve stem has a squared shank to guide it loosely at the edges in the gland member whose bore is substantially circular, with a slight taper to permit a little play in the movements of the valve stem therein. A conical face at the end of the valve stem mates with the inner edge of the valve seat (see Fig. 1). This arrangement of gland, valve stem, and valve seat makes a packless joint for the valve device in the outlet opening. By tightening the gland 8 (which may be of bronze) through bolts 11 there is a tendency for it to swell outwardly to seal its friction fit, to drive inwardly to seal its conical surface contact 9 with the valve seat 7 and to drive the valve seat base into sealing contact with its backing flange 6. For steam to leave the outlet opening in any by-pass around the valve it would need to find a passage through two of the three seals at 15, 9, and 16, all of which are tightened by bolting down the gland member 8.

The inverted bucket 5 has a small vent hole 17 at its top surface. To keep this hole open I hang a wire 18 from the top surface. The wire extends into the bucket and is weighted at the bottom like a pendulum. It has such a loose fit in the hole, that as the bucket rocks up and down, the weighted wire 18 swings sidewise at the bottom and works around rubbing the edges of the hole 17 clean to keep it open.

The two sectional views, Figs. 1 and 2, show the trap in closed and open position and illustrate the extreme movements of the parts when the trap is assembled and operating. The bucket support at its side wall on the pivot pin 19 supported by the gland 8 results in a leverage from that pin to the center of gravity of the spherical-shaped bucket which is close to the center in the form shown. This is the long arm of a bell crank lever and the short arm of this lever is the short distance between the two pivot pins 19 and 20 at the outlet, the outer one 20 connecting the valve stem. Such a leverage is of a very substantial amount which is quite desirable since the valve when closed is under differential pressures tending to hold it closed. A good leverage is desirable for opening it and this is provided by my arrangement. But it should be noted that the leverage is obtained without the use of levers, apart from the body of the inverted bucket and its protuberance 13 for the pivot pin connections. Whereas the prior art traps commonly provide a bucket and additional lever parts for operation I will provide the bucket alone which by my arrangement performs all the functions of the levers as well as of the bucket.

This arrangement has an advantage in the simplification of parts but extends beyond this and lends itself to the convenient removal of the trap mechanism as a unit. For example, (upon removing the trap cover 1 and the nuts 10 and 11 clamping the gland member) the inverted bucket, the gland, and the valve stem is removable and replaceable as an assembled unit. So far as I know this has not been possible before in traps operating on the inverted bucket principle. In such prior art traps with the outlet commonly at the top, the pipe connections there had to be taken off and the system of tangible levers in addition to the bucket required a lot of trouble in repair and replacement work.

The cover or upper part 1 of my preferred trap casing is joined to the lower part by bolts 20 on a sloping central plane 21. So the lower part has a high side for the horizontal outlet connection 4, and a low side 22 to permit the bucket to pass over the edge upon a straight pull in line with outlet opening 4 to remove the frictional fitting gland 8 in that opening. The valve seat may be fished out with a wire. All the critical parts may be inspected, repaired, or replaced, and finally tested outside the casing and the assembled unit of all movable parts inserted by merely pushing the gland in the outlet and tightening its bolts 10 and 11. In this work the inlet and outlet pipes remain in place without disturbance.

I prefer the spherical shape of the trap casing because it gives the greatest volume with the least radiation surface. Since my construction does not need a separate system of levers for the inverted bucket to operate, I get a great economy of space and this is helped by an inverted bucket with spherical walls closely spaced to the casing walls. This shaped bucket when made large enough for a given operating capacity does not require waste space between it and the casing, whereas an inverted bucket of different shape would require a larger casing in which quite a lot of space is wasted, to accommodate it. One of the real advantages of my arrangement over the prior art is the provision of a relatively small size trap for a given capacity where the inverted bucket principle is useful.

In operation the trap is normally full of water. The inverted bucket is floated by steam entering the trap from the bottom. If water enters the trap it replaces the steam in the bucket. The latter then sinks, and opens the valve to let the water out until steam again enters the bucket. An auxiliary air vent 24 is provided as shown and it is conveniently made of a small pipe extending from the gland and carried thereby. With steam in the bucket, a small amount leaks through the vent hole 17 and is condensed. The principle of the inverted bucket trap might be explained further but it is well known. My invention is directed to the improvement of the structural features by which the main principle can be operated to better practical advantage.

Having described my invention in the specific form now preferred, I desire to claim it as broadly as the prior art permits.

1. A steam trap comprising in combination a casing having a side outlet, a valve stem movable to and from a seat in the outlet opening, an inverted bucket pivoted at a point adjacent the outlet and in position to overlie an inlet opening in the bottom of the casing, said bucket being connected to operate said valve stem by a rocking motion of the bucket, and a weighted wire hung loosely in a vent hole at the top of the bucket whereby the vent hole is kept cleaned by a pendulum-like swinging motion induced whenever the bucket rocks on its pivot.

2. A steam trap comprising a casing made of top and bottom parts removably joined together on a sloping plane, the bottom part being provided with a substantially horizontal outlet on its high side and a substantially vertical inlet on its bottom side, an inverted bucket in the casing over its inlet and of a size to be removed over the low edge of the bottom part and in a line with said outlet opening on the high side, and a valve device linked to the bucket for operation in the outlet by movement of the bucket.

3. A steam trap comprising a casing divided for separation on an inclined plane, the bottom part having a substantially horizontal opening on its high side near its edge, a frustrum-shaped annular valve seat member with its base seated against a circular shoulder in said opening, a gland member extending into the opening and having a tapered end to fit over the valve seat member and with a friction fit in the outlet opening, the head of said gland having flanges to overlie the inside edge of said opening with means to tighten the gland in place from the inside of the bottom casing part, an arm on said gland head extending into the trap, an inverted bucket pivoted at its side to said arm and a valve stem pivoted to the bucket adjacent said arm for movement to and from said valve seat by rocking movements of the bucket, all arranged so as to permit the bucket, the gland, and the valve stem to be removed from or applied to the bottom casing part in line with the horizontal outlet and over the low edge of the bottom part, to give access for inspection and repair to all the valve parts and seat without disturbing the pipe connections to the casing.

4. A steam trap comprising a substantially spherical casing divided for separation upon a sloping plane passing substantially through the center of the casing, the bottom part of said casing having an outlet passage in the high side and an inlet passage in the bottom side, an inverted bucket over the inlet passage and valve mechanism extending into the trap from the outlet passage, said bucket being connected to the valve mechanism to operate it according to the buoyancy of the bucket in fluid admitted to the trap in line with bottom opening of the bucket.

5. A steam trap comprising a substantially spherical casing divided for separation upon a sloping central plane, the bottom part of said trap having an outlet in its high side and an inlet in its bottom side, an inverted bucket having curved walls for close spacing with the casing walls, a valve mechanism for the outlet operable by the bucket movements.

6. A steam trap comprising a spherical casing divided for separation into top and bottom halves, the bottom half having the trap outlet at its side and the inlet at its bottom, a valve at the outlet and an inverted bucket for operating the valve, said bucket being normally assembled with the valve parts as a unit for insertion or removal from the trap when the top half is off.

7. A steam trap comprising a casing divided for separation into top and bottom parts, the bottom part having a side trap outlet, a packless valve gland removably clamped to the inside of the casing at said outlet, an inverted bucket pivoted at its side to said gland, a valve stem pivoted to the bucket close to the gland pivot, a valve seat in the outlet, all arranged upon the unclamping of the gland so as to remove the bucket, gland, and valve stem as an assembled unit without disturbing the pipe connections at the inlet or outlet.

8. In steam traps and the like having inverted bucket operating means, the combination of an inverted bucket, a pivoted support therefor for rocking movements of the bucket, said bucket having a vent hole on the upper side thereof, a wire loosely supported in said vent hole and extending into said bucket so as to swing or wiggle when the bucket is rocked on its pivot whereby said vent hole is automatically kept open.

In testimony whereof I have affixed my signature.

ALBERT CHESTER TRAVIS, Jr.